May 19, 1925.

W. E. SHARKEY 1,538,008

REDUCTION GEARING

Original Filed Oct. 10, 1921

Inventor

William E. Sharkey,
By Toulmin & Toulmin
Attorneys

Patented May 19, 1925.

1,538,008

UNITED STATES PATENT OFFICE.

WILLIAM E. SHARKEY, OF MIDDLETOWN, OHIO.

REDUCTION GEARING.

Original application filed October 10, 1921, Serial No. 506,592. Divided and this application filed April 18, 1923. Serial No. 632,834.

*To all whom it may concern:*

Be it known that I, WILLIAM E. SHARKEY, a citizen of the United States, residing at Middletown, in the county of Butler and State of Ohio, have invented certain new and useful Improvements in Reduction Gearing, of which the following is a specification, reference being had therein to the accompanying drawing.

This invention relates to improvements in reduction gearing.

The object of the invention has reference to the form of the gear teeth of both gear members so that the teeth of one will enter and withdraw from the teeth of the other without binding and without undue rubbing whereby the teeth on the internal member will readily roll into and out of mesh with the teeth on the outer member with the least friction and noise.

Heretofore much difficulty has been experienced in practice when attempts have been made to put into practical use reduction gearing of this general character. This difficulty has been due to the grinding and binding of the teeth of the inner and outer gear members. By my improved form of teeth I have been able in practice to overcome these objections by effecting practically a cam action between the teeth. This application is a division of my former application, Ser. No. 506,592, filed Oct. 10th, 1921, out of which I have carved the subject matter of this present application.

Figure 1:
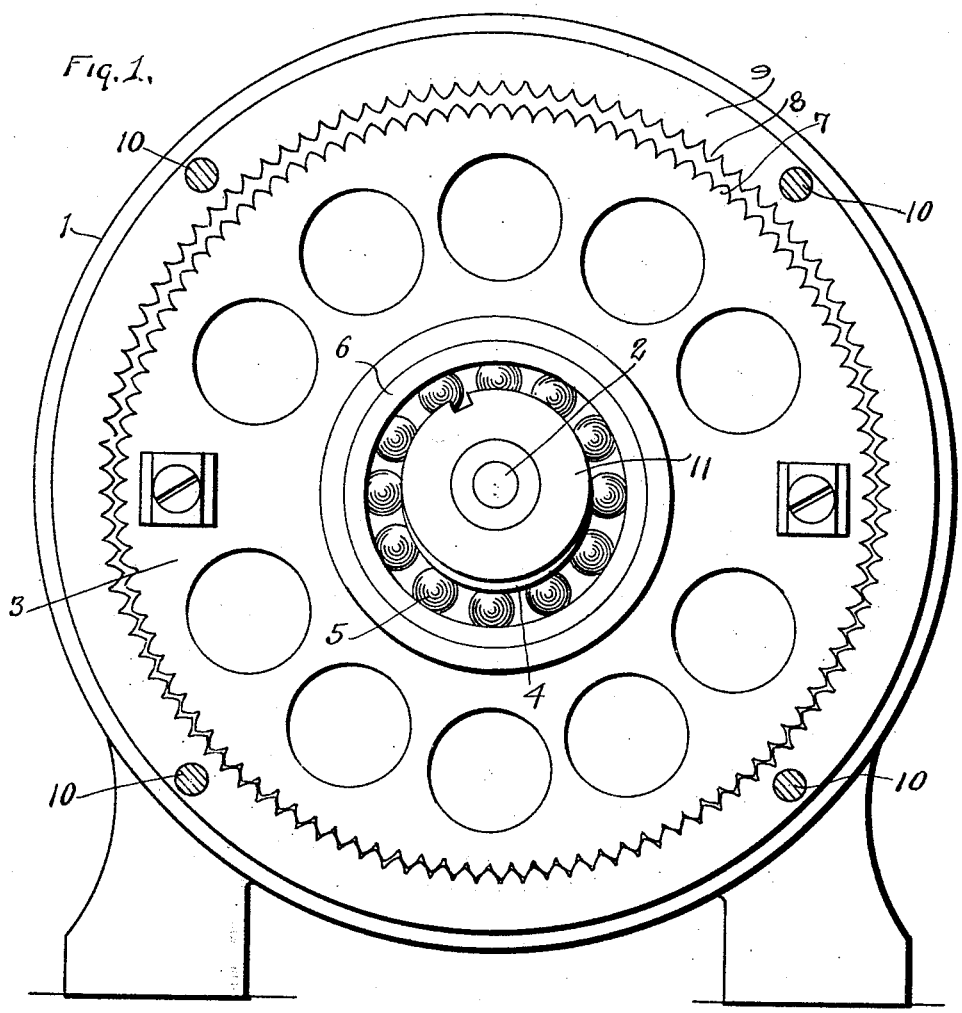
Fig. 1 is an elevation of a reduction gearing built on the plan set forth in my said previous application and showing the peculiar formation of my improved gear teeth.
Figure 2:
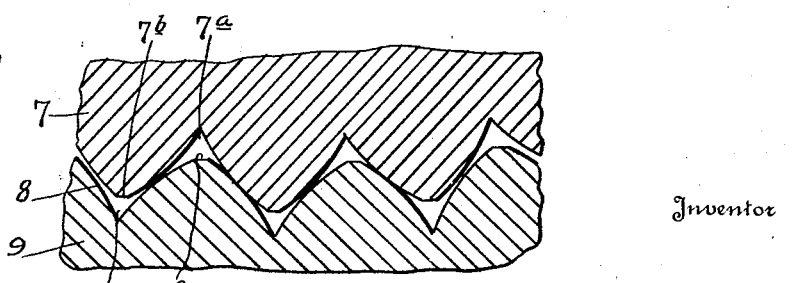
Fig. 2 is an enlarged sectional view of portions of the external fixed gear and the internal rotatable gear showing the formation and relation of the teeth.

As in my said other application the operative parts are enclosed in a casing of which the numeral 1 designates one member, all that is necessary to show in the present case. A shaft 2 is mounted in one member of the casing and on this shaft is in turn mounted a toothed gear wheel 3, with an eccentric 4 and bearing balls 5 intervening the shaft and the central eye or opening in said gear wheel. An annulus 6 retains the balls in place, being grooved to receive them as is also the eccentric 4—features not involved in the present invention. The only matter of interest in this connection is that when the shaft 2 is rotated the gear 3 is eccentrically rotated, to cause its teeth 7 shown more clearly in Fig. 2, to enter between the stationary teeth 8 of the internally toothed gear wheel 9 which by bolts 10 is secured in the casing. A nut 11 on the shaft 2 serves to secure the eccentric 4 thereon.

The teeth 7 of the rotatable gear 3 and the teeth 8 of the stationary gear 9 are of a depth substantially one half that of the width of the base having their faces laid out on an arc described about a point on a plane passing through the junction line between the teeth and a distance from the junction line of the teeth approximately one half the width of the base of said teeth and so arranged that the blunt nose $7^b$ of each tooth 7 will lie in the space formed by the junction at $8^b$ of two of the teeth 8 and the blunt nose $8^a$ of each tooth 8 will lie in the space formed by the junction at $7^a$ of two of the teeth 7. It will also be noted that the side walls of the teeth intersect on a straight line and in operation the teeth have practically a cam action.

The surfaces of the teeth 8 being slightly convex, and the surfaces of the teeth 7 being also slightly convex, enable the teeth, on entering and leaving, to approach a true rolling contact and thus eliminate or reduce the friction incident through the sliding of the flat surfaces one on the other. This convexity reduces friction between the teeth by thus affording a species of rolling contact.

The effect is to enable the eccentrically-rotated teeth 7 of the gear 3 to enter between the stationary teeth 8 of the gear 9 and withdraw therefrom without binding or slipping and devoid of any other impediment as the gear 3 eccentrically rotates, though its teeth roll into and out of mesh with the stationary teeth. The entrance and withdrawal of one set of teeth between the others is not the result of a radial movement alone of the movable gear, but of a radial movement plus a rolling movement, and it has developed in practice that by forming the teeth after the fashion here shown and described this entrance and withdrawal of the readily moving rotatable teeth is smoothly and uniformly accomplished without any undue wear.

Having thus fully described my invention, what I claim as new and desire to secure by Letters Patent, is:—

1. In a reduction gearing, the combination with a stationary gear having internal teeth, of a rotatable gear having exterior teeth, the depth of all of said teeth being substantially one half that of the width of the base, said teeth having their faces laid out on an arc described about a point on a plane passing through the junction line between the teeth and a distance from the junction line of the teeth approximately one half the width of the base of the teeth and so arranged that the blunt nose of a tooth on one gear will lie in the space formed by the junction of two teeth on the other gear.

2. In a reduction gearing the combination with a stationary gear having internal teeth of depth substantially one half that of the width of the base, of a rotatable gear having exterior teeth of a depth substantially one half that of the width of the base, the side walls of said teeth intersecting on a straight line, and the faces of said teeth being laid out on an arc described about a point on a plane passing through the junction line between said teeth and a distance from said junction line approximately one half of the width of the base of the teeth and so arranged that the blunt nose of a tooth on one gear will lie in the space formed by the junction of two teeth on another gear, whereby the teeth have substantially a cam action.

In testimony whereof, I affix my signature.

WILLIAM E. SHARKEY.